US006931084B1

(12) United States Patent
Eberlein et al.

(10) Patent No.: US 6,931,084 B1
(45) Date of Patent: Aug. 16, 2005

(54) DIFFERENTIAL CODING AND CARRIER RECOVERY FOR MULTICARRIER SYSTEMS

(75) Inventors: Ernst Eberlein, Grossenseebach (DE); Sabah Badri, Erlangen (DE); Stefan Lipp, Erlangen (DE); Stephan Buchholz, Munich (DE); Albert Heuberger, Erlangen (DE); Heinz Gerhaeuser, Waischenfeld (DE); Robert Fischer, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/673,266

(22) PCT Filed: Apr. 14, 1998

(86) PCT No.: PCT/EP98/02167

§ 371 (c)(1),
(2), (4) Date: Nov. 29, 2000

(87) PCT Pub. No.: WO99/53664

PCT Pub. Date: Oct. 21, 1999

(51) Int. Cl.[7] .......................... H03D 1/04; H03D 1/06; H03K 5/01; H03K 6/04; H04B 1/10; H04L 1/00
(52) U.S. Cl. ...................................................... 375/346
(58) Field of Search ....................... 375/346; 370/32.1; 379/410

(56) References Cited

U.S. PATENT DOCUMENTS

| | | | | | |
|---|---|---|---|---|---|
| 4,968,955 A | * | 11/1990 | Yoshida et al. | ............ | 329/304 |
| 5,166,924 A | * | 11/1992 | Moose | ........................ | 370/289 |
| 5,202,643 A | * | 4/1993 | Sato | ........................... | 329/309 |
| 5,732,105 A | * | 3/1998 | Andren et al. | ............. | 375/226 |
| 5,771,224 A | | 6/1998 | Seki et al. | .................. | 370/206 |
| 5,790,516 A | * | 8/1998 | Gudmundson et al. | ..... | 370/210 |
| 5,889,759 A | * | 3/1999 | McGibney | .................. | 370/207 |
| 5,946,292 A | * | 8/1999 | Tsujishita et al. | ........... | 370/204 |
| 5,999,129 A | * | 12/1999 | Rose | .......................... | 342/394 |
| 6,292,777 B1 | * | 9/2001 | Inoue et al. | ................ | 704/230 |
| 6,377,683 B1 | * | 4/2002 | Dobson et al. | ........ | 379/406.12 |
| 6,466,958 B1 | * | 10/2002 | Van Wechel et al. | ....... | 708/422 |
| 6,574,283 B1 | * | 6/2003 | Sakoda et al. | ............. | 375/262 |
| 6,690,745 B1 | * | 2/2004 | Horii et al. | ................. | 375/316 |

FOREIGN PATENT DOCUMENTS

| | | | | |
|---|---|---|---|---|
| EP | 1193934 A2 | * | 4/2002 | ........... H04L 27/26 |
| JP | 8265293 | | 10/1996 | |

(Continued)

OTHER PUBLICATIONS

Moose, "Differentially Coded Multi-Frequency Modulation for Digital Communications", *Signal Processing V—Theories and Applications*, Proceedings of EUSIPCO-90 Fifth European Signal Processing Conference, Barcelona, Spain, vol. III, pp. 1807-1810 (Sep. 1990).

(Continued)

*Primary Examiner*—Stephen Chin
*Assistant Examiner*—Harry Vartanian
(74) *Attorney, Agent, or Firm*—Roylance, Abrams, Berdo & Goodman, L.L.P.

(57) ABSTRACT

A method of performing an echo phase offset correction in a multi-carrier demodulation system involves the step of differential phase decoding phase shifts based on a phase difference between simultaneous carriers having different frequencies. An echo phase offset is determined for each decoded phase shift by eliminating phase shift uncertainties related to the transmitted information from the decoded phase shift. The echo phase offsets are averaged in order to generate an averaged offset. Finally, each decoded phase shift is corrected based on the averaged offset.

16 Claims, 7 Drawing Sheets

FOREIGN PATENT DOCUMENTS

| | | |
|---|---|---|
| JP | 9149092 | 6/1997 |
| JP | 1041991 | 2/1998 |
| WO | 9205646 | 4/1992 |
| WO | 9800946 | 1/1998 |

OTHER PUBLICATIONS

Moose, "A Technique for Orthogonal Frequency Division Multiplexing Frequency Offset Correction", *IEEE Transactions on Communications,* vol. 42, No. 10, pp. 2908-2914 (Oct. 1994).

Keller and Hanzo; "Orthogonal Frequency Division Multiplex Synchronisation Techniques for Wireless Local Area Networks", *IEEE International Symposium on Personal, Indoor and Mobile Radio Communications*, pp. 963-967 (Oct. 1996).

Zou and Wu, "COFDM: An Overview", *IEEE Transactions on Broadcasting*, vol. 41, No. 1, pp. 1-8 (Mar. 1995).

* cited by examiner

US 6,931,084 B1

DIFFERENTIAL CODING AND CARRIER RECOVERY FOR MULTICARRIER SYSTEMS

FIELD OF THE INVENTION

The present invention relates to methods and apparatus for performing modulation and de-modulation in multi-carrier modulation systems (MCM systems) and, in particular, to methods and apparatus for differential mapping and de-mapping of information onto carriers of multi-carrier modulation symbols in such systems. Furthermore, the present invention relates to methods and apparatus for performing an echo phase offset correction when decoding information encoded onto carriers of multi-carrier modulation symbols in multi-carrier modulation systems.

BACKGROUND OF THE INVENTION

The present invention generally relates to broadcasting of digital data to mobile receivers over time-variant multipath channels. More specifically, the present invention is particularly useful in multipath environments with low channel coherence time, i.e. rapidly changing channels. In preferred embodiments, the present invention can be applied to systems implementing a multicarrier modulation scheme. Multi-carrier modulation (MCM) is also known as orthogonal frequency division multiplexing (OFDM).

In a MCM transmission system binary information is represented in the form of a complex spectrum, i.e. a distinct number of complex subcarrier symbols in the frequency domain. In the modulator a bitstream is represented by a sequence of spectra. Using an inverse Fourier-transform (IFFT) a MCM time domain signal is produced from this sequence of spectra.

FIG. 7 shows a MCM system overview. At 100 a MCM transmitter is shown. A description of such a MCM transmitter can be found, for example, in William Y. Zou, Yiyan Wu, "COFDM: AN OVERVIEW", IEEE Transactions on Broadcasting, vol. 41, No. 1, March 1995.

A data source 102 provides a serial bitstream 104 to the MCM transmitter. The incoming serial bitstream 104 is applied to a bit-carrier mapper 106 which produces a sequence of spectra 108 from the incoming serial bitstream 104. An inverse fast Fourier transform (FFT) 110 is performed on the sequence of spectra 108 in order to produce a MCM time domain signal 112. The MCM time domain signal forms the useful MCM symbol of the MCM time signal. To avoid intersymbol interference (ISI) caused by multipath distortion, a unit 114 is provided for inserting a guard interval of fixed length between adjacent MCM symbols in time. In accordance with a preferred embodiment of the present invention, the last part of the useful MCM symbol is used as the guard interval by placing same in front of the useful symbol. The resulting MCM symbol is shown at 115 in FIG. 7.

A unit 116 for adding a reference symbol for each predetermined number of MCM symbols is provided in order to produce a MCM signal having a frame structure. Using this frame structure comprising useful symbols, guard intervals and reference symbols it is possible to recover the useful information from the MCM signal at the receiver side.

The resulting MCM signal having the structure shown at 118 in FIG. 7 is applied to the transmitter front end 120. Roughly speaking, at the transmitter front end 120, a digital/analog conversion and an up-converting of the MCM signal is performed. Thereafter, the MCM signal is transmitted through a channel 122.

Following, the mode of operation of a MCM receiver 130 is shortly described referring to FIG. 7. The MCM signal is received at the receiver front end 132. In the receiver front end 132, the MCM signal is down-converted and, furthermore, a digital/analog conversion of the down-converted signal is performed. The down-converted MCM signal is provided to a frame synchronization unit 134. The frame synchronization unit 134 determines the location of the reference symbol in the MCM symbol. Based on the determination of the frame synchronization unit 134, a reference symbol extracting unit 136 extracts the framing information, i.e. the reference symbol, from the MCM symbol coming from the receiver front end 132. After the extraction of the reference symbol, the MCM signal is applied to a guard interval removal unit 138.

The result of the signal processing performed so far in the MCM receiver are the useful MCM symbols. The useful MCM symbols output from the guard interval removal unit 138 are provided to a fast Fourier transform unit 140 in order to provide a sequence of spectra from the useful symbols. Thereafter, the sequence of spectra is provided to a carrier-bit mapper 142 in which the serial bitstream is recovered. This serial bitstream is provided to a data sink 144.

As it is clear from FIG. 7, every MCM transmitter 100 must contain a device which performs mapping of the transmitted bitstreams onto the amplitudes and/or phases of the sub-carriers. In addition, at the MCM receiver 130, a device is needed for the inverse operation, i.e. retrieval of the transmitted bitstream from the amplitudes and/or phases of the sub-carriers.

For a better understanding of MCM mapping schemes, it is preferable to think of the mapping as being the assignment of one ore more bits to one or more sub-carrier symbols in the time-frequency plane. In the following, the term symbol or signal point is used for the complex number which represents the amplitude and/or phase modulation of a subcarrier in the equivalent baseband. Whenever all complex numbers representing all subcarrier symbols are designated, the term MCM symbol is used.

DESCRIPTION OF PRIOR ART

In principle, two methods for mapping the bitstream into the time-frequency plane are used in the prior art:

A first method is a differential mapping along the time axis. When using differential mapping along the time axis one or more bits are encoded into phase and/or amplitude shifts between two subcarriers of the same center frequency in adjacent MCM symbols. Such an encoding scheme is shown in FIG. 8. The arrows depicted between the sub-carrier symbols correspond to information encoded in amplitude and/or phase shifts between two subcarrier symbols.

A system applying such a mapping scheme is defined in the European Telecommunication standard ETS 300 401 (EU147-DAB). A system compliant to this standard uses Differential Quadrature Phase Shift Keying (DQPSK) to encode every two bits into a 0, 90, 180 or 270 degrees phase difference between two subcarriers of the same center frequency which are located in MCM symbols adjacent in time.

A second method for mapping the bitstream into the time-frequency plane is a non-differential mapping. When using non-differential mapping the information carried on a sub-carrier is independent of information transmitted on any other subcarrier, and the other subcarrier may differ either in frequency, i.e. the same MCM symbol, or in time, i.e. adjacent MCM symbols. A system applying such a mapping scheme is defined in the European Telecommunication standard ETS 300 744 (DVB-T). A system compliant to this standard uses 4, 16 or 64 Quadrature Amplitude Modulation (QAM) to assign bits to the amplitude and phase of a subcarrier.

The quality with which transmitted multi-carrier modulated signals can be recovered at the receiver depends on the properties of the channel. The most interesting property when transmitting MCM signals is the time interval at which a mobile channel changes its characteristics considerably. The channel coherence time $T_c$ is normally used to determine the time interval at which a mobile channel changes its characteristics considerably. $T_c$ depends on the maximum Doppler shift as follows:

$$f_{Doppler,max} = v \cdot f_{carrier}/c \qquad (Eq.1)$$

with
v: speed of the mobile receiver in [m/s]
fcarrier: carrier frequency of the RF signal [Hz]
c: speed of light ($3 \cdot 10^8$ m/s)

The channel coherence time $T_c$ is often defined to be $$T_c|_{50\%} = \frac{9}{16\pi f_{Doppler,max}} \text{ or } T_c|_{2nd\,Def.} = \frac{9}{16\pi f_{Doppler,max}^2} \qquad (Eq.\,2)$$

It becomes clear from the existence of more than one definition, that the channel coherence time $T_c$ is merely a rule-of-thumb value for the stationarity of the channel. As explained above, the prior art time-axis differential mapping requires that the mobile channel be quasi stationary during several MCM symbols periods, i.e. required channel coherence time Tc>>MCM symbol period. The prior art non-differential MCM mapping only requires that the mobile channel be quasi stationary during one symbol interval, i.e. required channel coherence time>MCM symbol period.

Thus, both prior art mapping schemes have specific disadvantages. For differential mapping into time axis direction the channel must be quasi stationary, i.e. the channel must not change during the transmission of two MCM symbols adjacent in time. If this requirement is not met, the channel induced phase and amplitude changes between MCM symbols will yield an increase in bit error rate.

With non-differential mapping exact knowledge of the phase of each subcarrier is needed (i.e. coherent reception). For multipath channels, coherent reception can only be obtained if the channel impulse response is known. Therefore, a channel estimation has to be part of the receiver algorithm. The channel estimation usually needs additional sequences in the transmitted waveform which do not carry information. In case of rapidly changing channels, which necessitate update of the channel estimation at short intervals, the additional overhead can quickly lead to insufficiency of non-differential mapping.

P. H. Moose: "Differentially Coded Multi-Frequency Modulation for Digital Communications", SIGNAL PROCESSING THEORIES AND APPLICATIONS, 18.–21. September 1990, pages 1807–1810, Amsterdam, NL, teaches a differentially coded multi-frequency modulation for digital communications. A multi-frequency differential modulation is described in which symbols are differentially encoded within each baud between adjacent tones. At the receiver, following a digital Fourier transform (DFT), the complex product between the DFT coefficient of digital frequency k and the complex conjugate of the DFT coefficient of digital frequency k−1 is formed. Thereafter, the result is multiplied by appropriate terms such that the differentially encoded phase bits are realigned to the original constellations. Thus, the constellation following the differential decoding must correspond to the original constellation.

SUMMARY OF THE INVENTION

It is an object of the present invention to provide methods and devices for performing an echo phase offset correction in a multi-carrier demodulation system.

In accordance with a first aspect, the present invention provides a method of performing an echo phase offset correction in a multi-carrier demodulation system, comprising the steps of:

differential phase decoding phase shifts based on a phase difference between simultaneous carriers having different frequencies;

determining an echo phase offset for each decoded phase shift by eliminating phase shift uncertainties related to the transmitted information from the decoded phase shift;

averaging the echo phase offsets in order to generate an averaged offset; and correcting each decoded phase shift based on the averaged offset.

In accordance with a second aspect, the present invention provides a method of performing an echo phase offset correction in a multi-carrier demodulation system, comprising the steps of:

differential phase decoding phase shifts based on a phase difference between simultaneous carriers having different frequencies, the phase shifts defining signal points in a complex plane;

pre-rotating the signal points into the sector of the complex plane between −45° and +45°;

determining parameters of a straight line approximating the location of the pre-rotated signal points in the complex plane;

determining a phase offset based on the parameters; and correcting each decoded phase shift based on the phase offset.

In accordance with a third aspect, the present invention provides an echo phase offset correction device for a multi-carrier demodulation system, comprising:

a differential phase decoder for decoding phase shifts based on a phase difference between simultaneous carriers having different frequencies;

means for determining an echo phase offset for each decoded phase shift by eliminating phase shift uncertainties related to the transmitted information from the decoded phase shift;

means for averaging the echo phase offsets in order to generate an averaged offset; and means for correcting each decoded phase shift based on the averaged offset.

In accordance with a fourth aspect, the present invention provides an echo phase offset correction device for a multi-carrier demodulation system, comprising:

a differential phase decoder for decoding phase shifts based on a phase difference between simultaneous carriers having different frequencies, the phase shifts defining signal points in a complex plane;

means for pre-rotating the signal points into the sector of the complex plane between −45° and +45°;

means for determining parameters of a straight line approximating the location of the pre-rotated signal points in the complex plane;

means for determining a phase offset based on the parameters; and means for correcting each decoded phase shift based on the phase offset.

The present invention provides methods and devices for performing an echo phase offset correction, suitable for multi-carrier (OFDM) digital broadcasting over rapidly changing multipath channels, comprising differential encoding of the data along the frequency axis such that there is no need for channel stationarity exceeding one multicarrier symbol.

When using the mapping process along the frequency axis it is preferred to make use of a receiver algorithm that will correct symbol phase offsets that can be caused by channel echoes.

The mapping scheme along the frequency axis for multi-carrier modulation renders the transmission to a certain extent independent of rapid changes in the multipath channel without introducing a large overhead to support channel estimation. Especially systems with high carrier frequencies and/or high speeds of the mobile carrying the receiving unit can benefit from such a mapping scheme.

Thus, the mapping scheme of a differential encoding along the frequency axis does not exhibit the two problems of the prior art systems described above. The mapping scheme is robust with regard to rapidly changing multipath channels which may occur at high frequencies and/or high speeds of mobile receivers.

The controlled respective parameters of the subcarriers are the phases thereof, such that the information is differentially phase encoded.

In accordance with the mapping described above, mapping is also differential, however, not into time axis direction but into frequency axis direction. Thus, the information is not contained in the phase shift between subcarriers adjacent in time but in the phase shift between subcarriers adjacent in frequency. Differential mapping along the frequency axis has two advantages when compared to prior art mapping schemes.

Because of differential mapping, no estimation of the absolute phase of the subcarriers is required. Therefore, channel estimation and the related overhead are not necessary. By choosing the frequency axis as direction for differentially encoding the information bitstream, the requirement that the channel must be stationary during several MCM symbols can be dropped. The channel only has to remain unchanged during the current MCM symbol period. Therefore, like for non-differential mapping it holds that required channel coherence time ≧ MCM symbol period.

The present invention provides methods and apparatus for correction of phase distortions that can be caused by channel echoes. As described above, differential mapping into frequency axis direction solves problems related to the stationarity of the channel. However, differential mapping into frequency axis direction may create a new problem. In multipath environments, path echoes succeeding or preceding the main path can lead to systematic phase offsets between sub-carriers in the same MCM symbol. In this context, the main path is thought of being the path echo with the highest energy content. The main path echo will determine the position of the FFT window in the receiver of an MCM system.

According to the present invention, the information will be contained in a phase shift between adjacent subcarriers of the same MCM symbol. If not corrected for, the path echo induced phase offset between two subcarriers can lead to an increase in bit error rate. Therefore, application of the MCM mapping scheme presented in this invention will preferably be used in combination with a correction of the systematic subcarrier phase offsets in case of a multipath channel.

The introduced phase offset can be explained from the shifting property of the Discrete Fourier Transform (DFT):

$$x[((n-m))_N] \stackrel{DFT}{\longleftrightarrow} X[k]e^{-j\frac{2\pi}{N}km} \quad \text{(Eq. 3)}$$

with $x[n]$: sampled time domain signal ($0 \le n \le N-1$)

$X[k]$: DFT transformed frequency domain signal ($0 \le k \le N-1$)

$N$: length of DFT $(\ldots)_N$: cyclic shift of the DFT window in the time $m$: length of DFT-Shift in the time domain Equation 3 shows, that in a multipath channel, echoes following the main path will yield a subcarrier dependent phase offset. After differential demapping in the frequency axis direction at the receiver, a phase offset between two neighboring symbols remains. Because the channel induced phase offsets between differentially demodulated symbols are systematic errors, they can be corrected by an algorithm.

In the context of the following specification, algorithms which help correcting the phase shift are called Echo Phase offset correction (EPOC) algorithms. Two such algorithms are described as preferred embodiments for the correction of phase distortions that can be caused by channel echoes. These algorithms yield a sufficient detection security for MCM frequency axis mapping even in channels with echoes close to the limits of the guard interval.

In principle, an EPOC algorithm must calculate the echo induced phase offset from the signal space constellation following the differential demodulation and subsequently correct this phase offset.

BRIEF DESCRIPTION OF THE DRAWINGS

In the following, preferred embodiments of the present invention will be explained in detail on the basis of the drawings enclosed, in which.

DETAILED DESCRIPTION OF THE PREFERRED EMBODIMENTS

Figure 7:
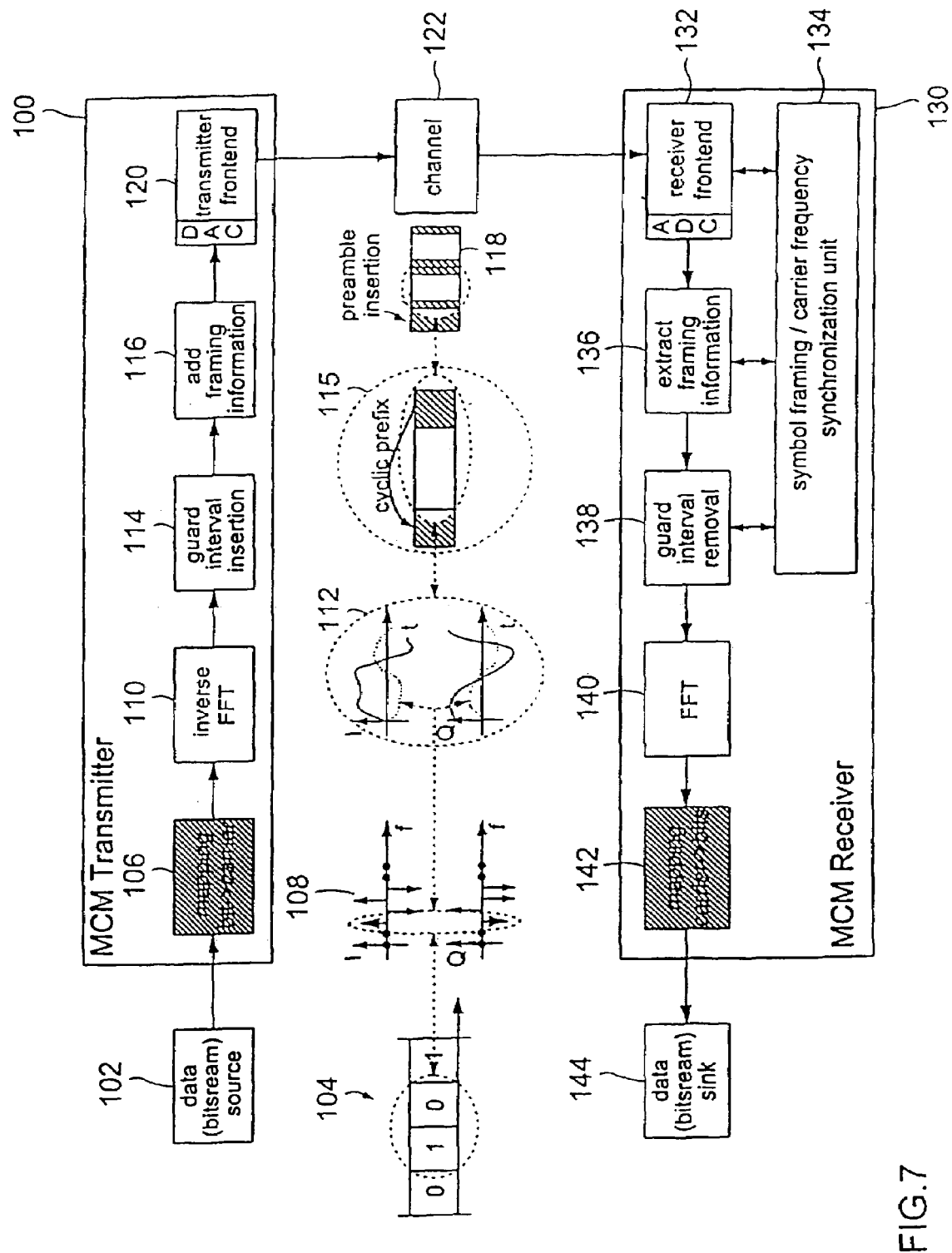
FIG. 7 shows a schematic block diagram of a generic multi-carrier modulation system.

In a preferred embodiment thereof, the present invention is applied to a MCM system as shown in FIG. 7. With respect to this MCM system, the present invention relates to the bit-carrier mapper 106 of the MCM transmitter 100 and the carrier-bit mapper 142 of the MCM receiver 130, which are depicted with a shaded background in FIG. 7.

Figure 1:
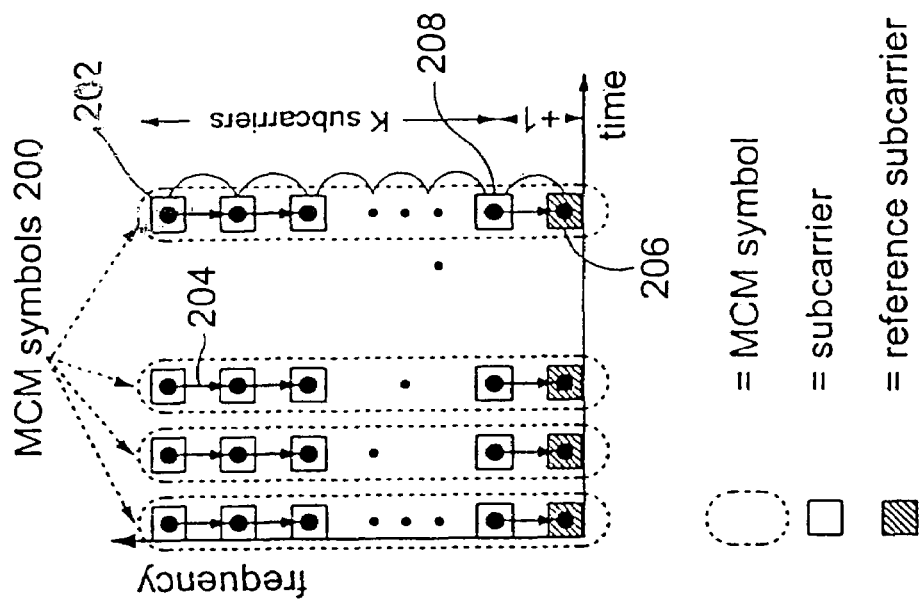
FIG. 1 shows a schematic view representing a mapping scheme used according to the invention.
Figure 8:
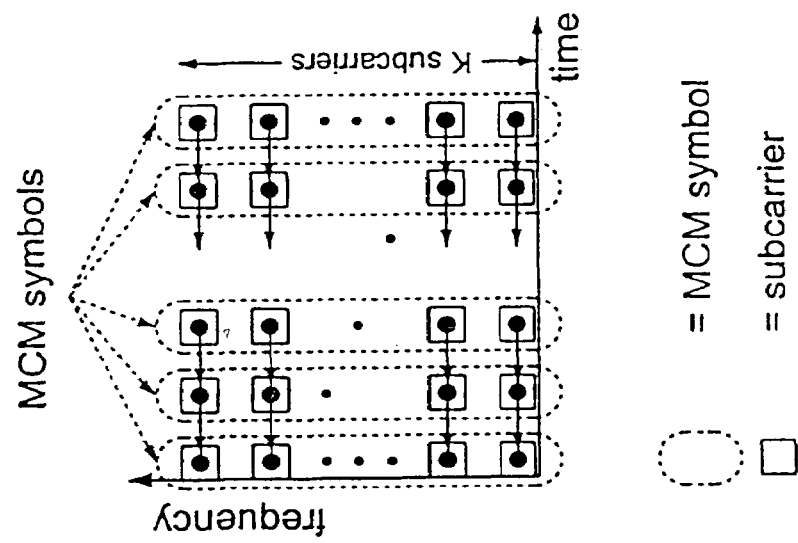
FIG. 8 shows a schematic view representing a prior art differential mapping scheme.

An preferred embodiment of an inventive mapping scheme used by the bit-carrier mapper 106 is depicted in FIG. 1. A number of MCM symbols 200 is shown in FIG. 1. Each MCM symbol 200 comprises a number of sub-carrier symbols 202. The arrows 204 in FIG. 1 illustrate information encoded between two sub-carrier symbols 202. As can be seen from the arrows 204, the bit-carrier mapper 106 uses a differential mapping within one MCM symbol along the frequency axis direction.

In the embodiment shown in FIG. 1, the first sub-carrier (k=0) in an MCM symbol 200 is used as a reference sub-carrier 206 (shaded) such that information is encoded between the reference sub-carrier and the first active carrier 208. The other information of a MCM symbol 200 is encoded between active carriers, respectively.

Thus, for every MCM symbol an absolute phase reference exists. In accordance with FIG. 1, this absolute phase reference is supplied by a reference symbol inserted into every MCM symbol (k=0). The reference symbol can either have a constant phase for all MCM symbols or a phase that varies from MCM symbol to MCM symbol. A varying phase can be obtained by replicating the phase from the last subcarrier of the MCM symbol preceding in time.

Figure 2:
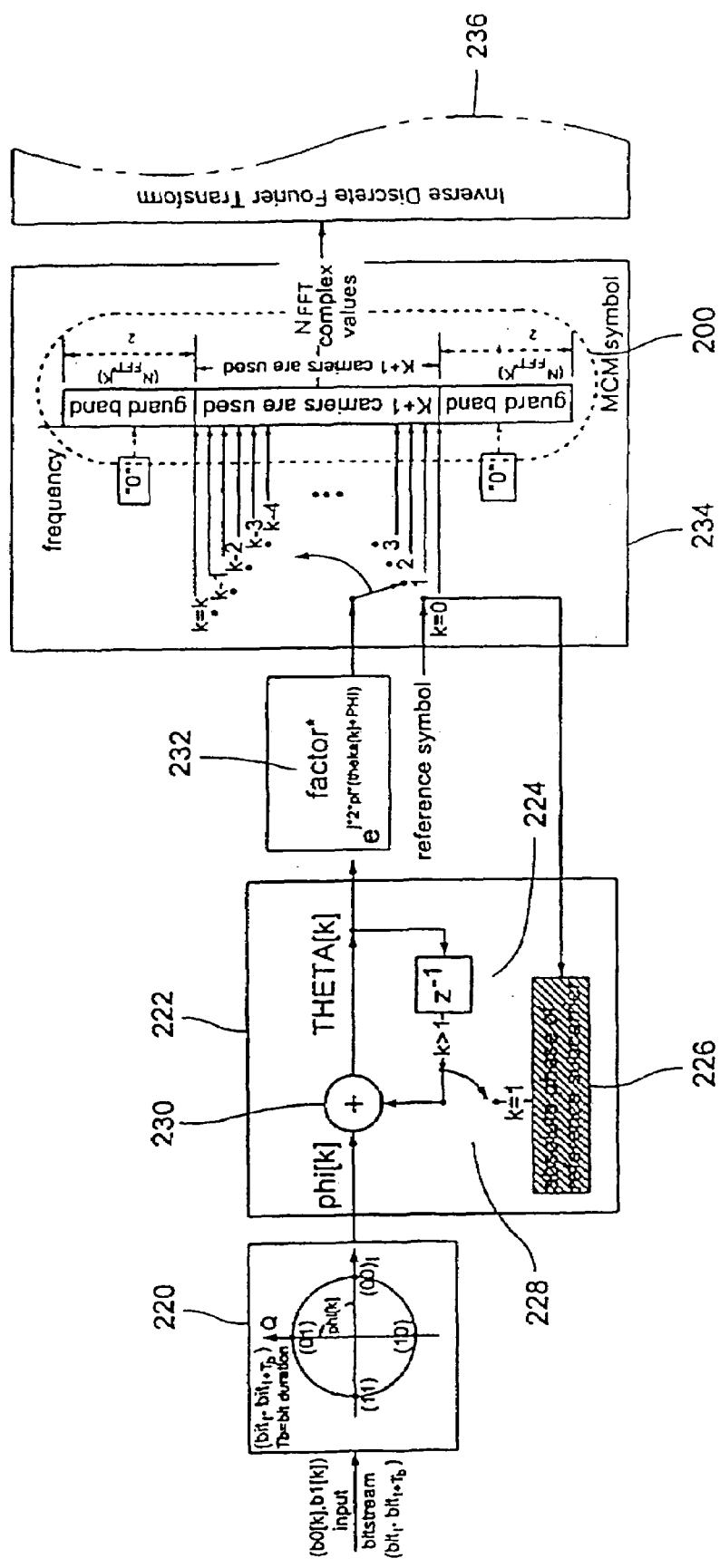
FIG. 2 shows a functional block diagram of an embodiment of a mapping device.

In FIG. 2 a preferred embodiment of a device for performing a differential mapping along the frequency axis is shown. Referring to FIG. 2, assembly of MCM symbols in the frequency domain using differential mapping along the frequency axis according to the present invention is described.

FIG. 2 shows the assembly of one MCM symbol with the following parameters:

NFFT designates the number of complex coefficients of the discrete Fourier transform, number of subcarriers respectively.

K designates the number of active carriers. The reference carrier is not included in the count for K.

According to FIG. 2, a quadrature phase shift keying (QPSK) is used for mapping the bitstream onto the complex symbols. However, other M-ary mapping schemes (MPSK) like 2-PSK, 8-PSK, 16-QAM, 16-APSK, 64-APSK etc. are possible.

Furthermore, for ease of filtering and minimization of aliasing effects some subcarriers are not used for encoding information in the device shown in FIG. 2. These subcarriers, which are set to zero, constitute the so-called guard bands on the upper and lower edges of the MCM signal spectrum.

At the input of the mapping device shown in FIG. 2, complex signal pairs b0[k], b1[k] of an input bitstream are received. K complex signal pairs are assembled in order to form one MCM symbol. The signal pairs are encoded into the K differential phase shifts phi[k] needed for assembly of one MCM symbol. In this embodiment, mapping from Bits to the 0, 90, 180 and 270 degrees phase shifts is performed using Gray Mapping in a quadrature phase shift keying device 220.

Gray mapping is used to prevent that differential detection phase errors smaller than 135 degrees cause double bit errors at the receiver.

Differential phase encoding of the K phases is performed in a differential phase encoder 222. At this stage of processing, the K phases phi[k] generated by the QPSK Gray mapper are differentially encoded. In principal, a feedback loop 224 calculates a cumulative sum over all K phases. As starting point for the first computation (k=0) the phase of the reference carrier 226 is used. A switch 228 is provided in order to provide either the absolute phase of the reference subcarrier 226 or the phase information encoded onto the preceding (i.e. $z^{-1}$, where $z^{-1}$ denotes the unit delay operator) subcarrier to a summing point 230. At the output of the differential phase encoder 222, the phase information theta [k] with which the respective subcarriers are to be encoded is provided. In preferred embodiments of the present invention, the subcarriers of a MCM symbol are equally spaced in the frequency axis direction.

The output of the differential phase encoder 222 is connected to a unit 232 for generating complex subcarrier symbols using the phase information theta[k]. To this end, the K differentially encoded phases are converted to complex symbols by multiplication with $$\text{factor} * e^{j*[2*pi*(theta[k]+PHI)]} \tag{Eq.4}$$

wherein factor designates a scale factor and PHI designates an additional angle. The scale factor and the additional angle PHI are optional. By choosing PHI=45° a rotated DQPSK signal constellation can be obtained.

Finally, assembly of a MCM symbol is effected in an assembling unit 234. One MCM symbol comprising $N_{FFT}$ subcarriers is assembled from $N_{FFT}$-K-1 guard band symbols which are "zero", one reference subcarrier symbol and K DQPSK subcarrier symbols. Thus, the assembled MCM symbol 200 is composed of K complex values containing the encoded information, two guard bands at both sides of the NFFT complex values and a reference subcarrier symbol.

The MCM symbol has been assembled in the frequency domain. For transformation into the time domain an inverse discrete Fourier transform (IDFT) of the output of the assembling unit 234 is performed by a transformator 236. In preferred embodiments of the present invention, the transformator 236 is adapted to perform a fast Fourier transform (FFT).

Further processing of the MCM signal in the transmitter as well as in the receiver is as described above referring to FIG. 7.

At the receiver a de-mapping device 142 (FIG. 7) is needed to reverse the operations of the mapping device described above referring to FIG. 2. The implementation of the de-mapping device is straightforward and, therefore, need not be described herein in detail.

However, systematic phase shifts stemming from echoes in multipath environments may occur between subcarriers in the same MCM symbol. This phase offsets can cause bit errors when demodulating the MCM symbol at the receiver.

Thus, it is preferred to make use of an algorithm to correct the systematic phase shifts stemming from echoes in multipath environments. Preferred embodiments of echo phase offset correction algorithms are explained hereinafter referring to FIGS. 3 to 6.

Figure 3B:
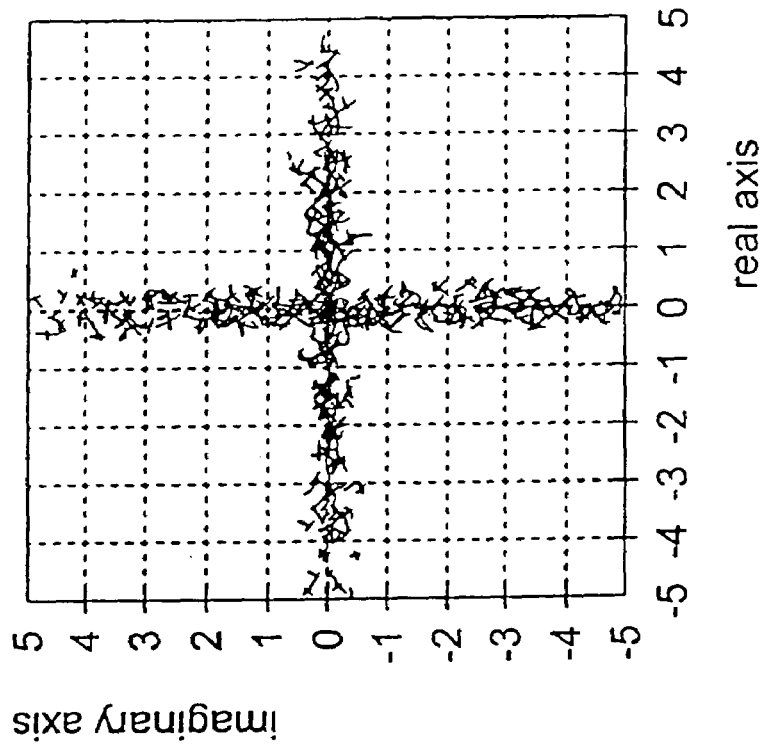
FIGS. 3A and 3B show scatter diagrams of the output of an differential de-mapper of a MCM receiver for illustrating the effect of an echo phase offset correction.
Figure 3A:
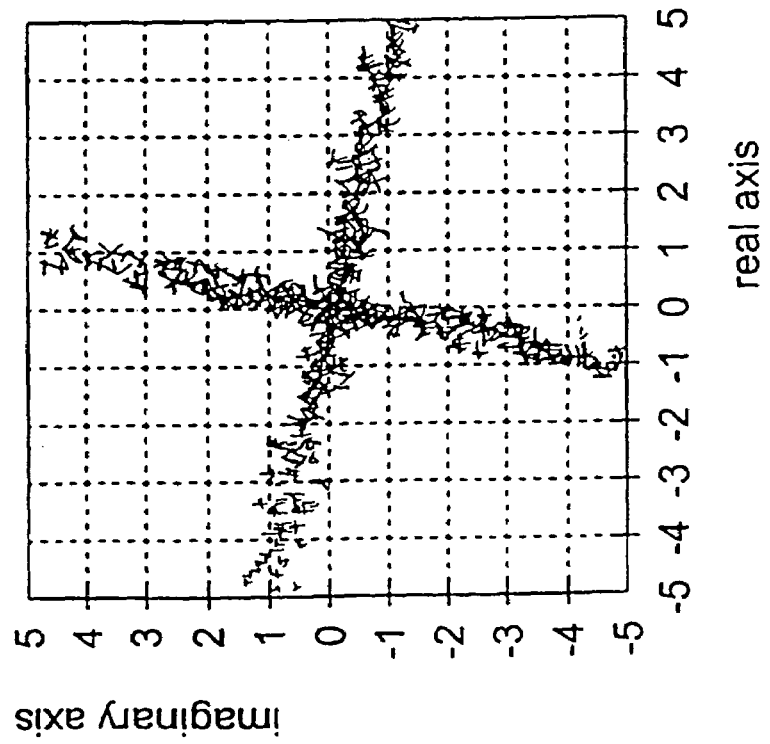

In FIGS. 3A and 3B, scatter diagrams at the output of a differential demapper of a MCM receiver are shown. As can be seen from FIG. 3A, systematic phase shifts between subcarriers in the same MCM symbol cause a rotation of the demodulated phase shifts with respect to the axis of the complex coordinate system. In FIG. 3B, the demodulated phase shifts after having performed an echo phase offset correction are depicted. Now, the positions of the signal points are substantially on the axis of the complex coordinate system. These positions correspond to the modulated phase shifts of 0°, 90°, 180° and 270°, respectively.

An echo phase offset correction algorithm (EPOC algorithm) must calculate the echo induced phase offset from the signal space constellation following the differential demodulation and subsequently-correct this phase offset.

For illustration purposes, one may think of the simplest algorithm possible which eliminates the symbol phase before computing the mean of all phases of the subcarriers. To illustrate the effect of such an EPOC algorithm, reference is made to the two scatter diagrams of subcarriers symbols contained in one MCM symbol in FIGS. 3A and 3B. This scatter diagrams have been obtained as result of an MCM simulation. For the simulation a channel has been used which might typically show up in single frequency networks. The echoes of this channel stretched to the limits of the MCM guard interval. The guard interval was chosen to be 25% of the MCM symbol duration in this case.

Figure 4:
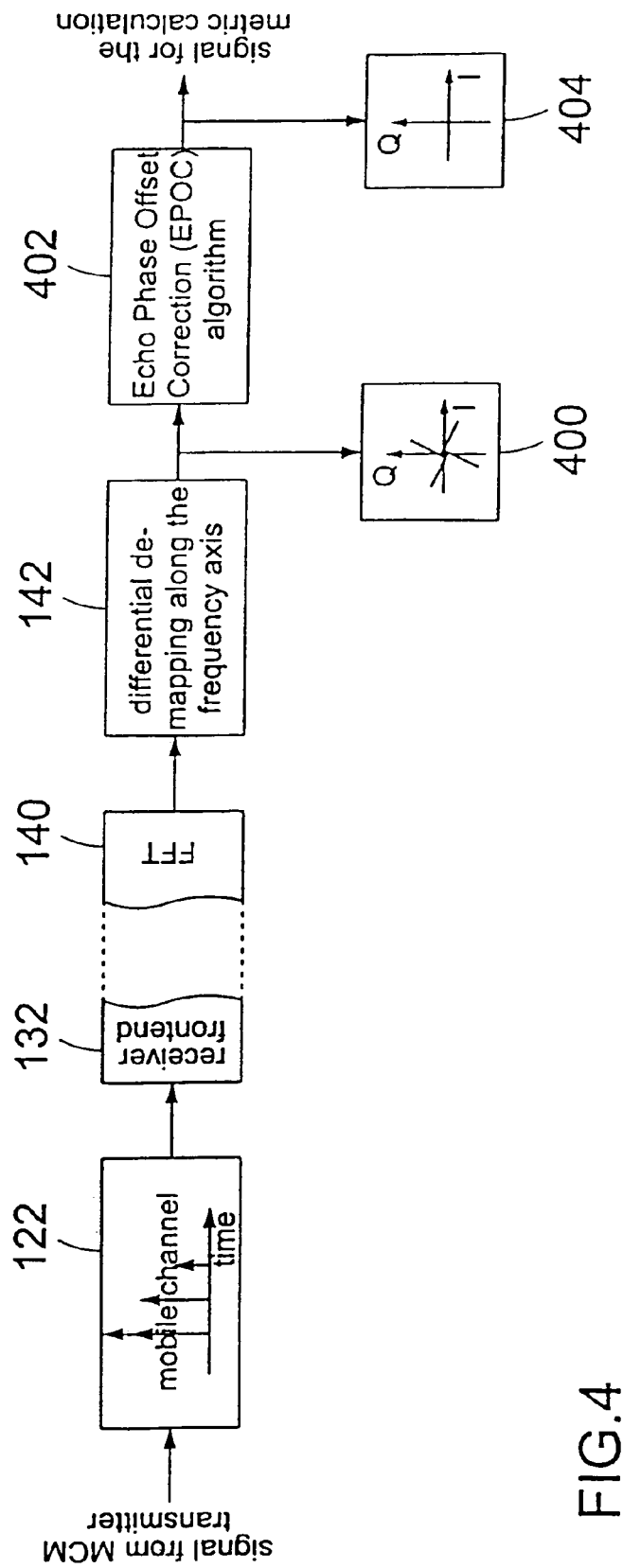
FIG. 4 shows a schematic block diagram for illustrating the position and the functionality of an echo phase offset correction unit.

FIG. 4 represents a block diagram for illustrating the position and the functionality of an echo phase offset correction device in a MCM receiver. The signal of a MCM transmitter is transmitted through the channel 122 (FIGS. 4 and 7) and received at the receiver frontend 132 of the MCM receiver. The signal processing between the receiver frontend and the fast Fourier transformator 140 has been omitted in FIG. 4. The output of the fast Fourier transformator is applied to the de-mapper, which performs a differential de-mapping along the frequency axis. The output of the de-mapper are the respective phase shifts for the subcarriers. The phase offsets of this phase shifts which are caused by echoes in multipath environments are visualized by a block 400 in FIG. 4 which shows an example of a scatter diagram of the subcarrier symbols without an echo phase offset correction.

The output of the de-mapper 142 is applied to the input of an echo phase offset correction device 402. The echo phase offset correction device 402 uses an EPOC algorithm in order to eliminate echo phase offsets in the output of the de-mapper 142. The result is shown in block 404 of FIG. 4, i.e. only the encoded phase shifts, 0°, 90°, 180° or 270° are present at the output of the correction device 402. The output of the correction device 402 forms the signal for the metric calculation which is performed in order to recover the bitstream representing the transmitted information.

Figure 5:
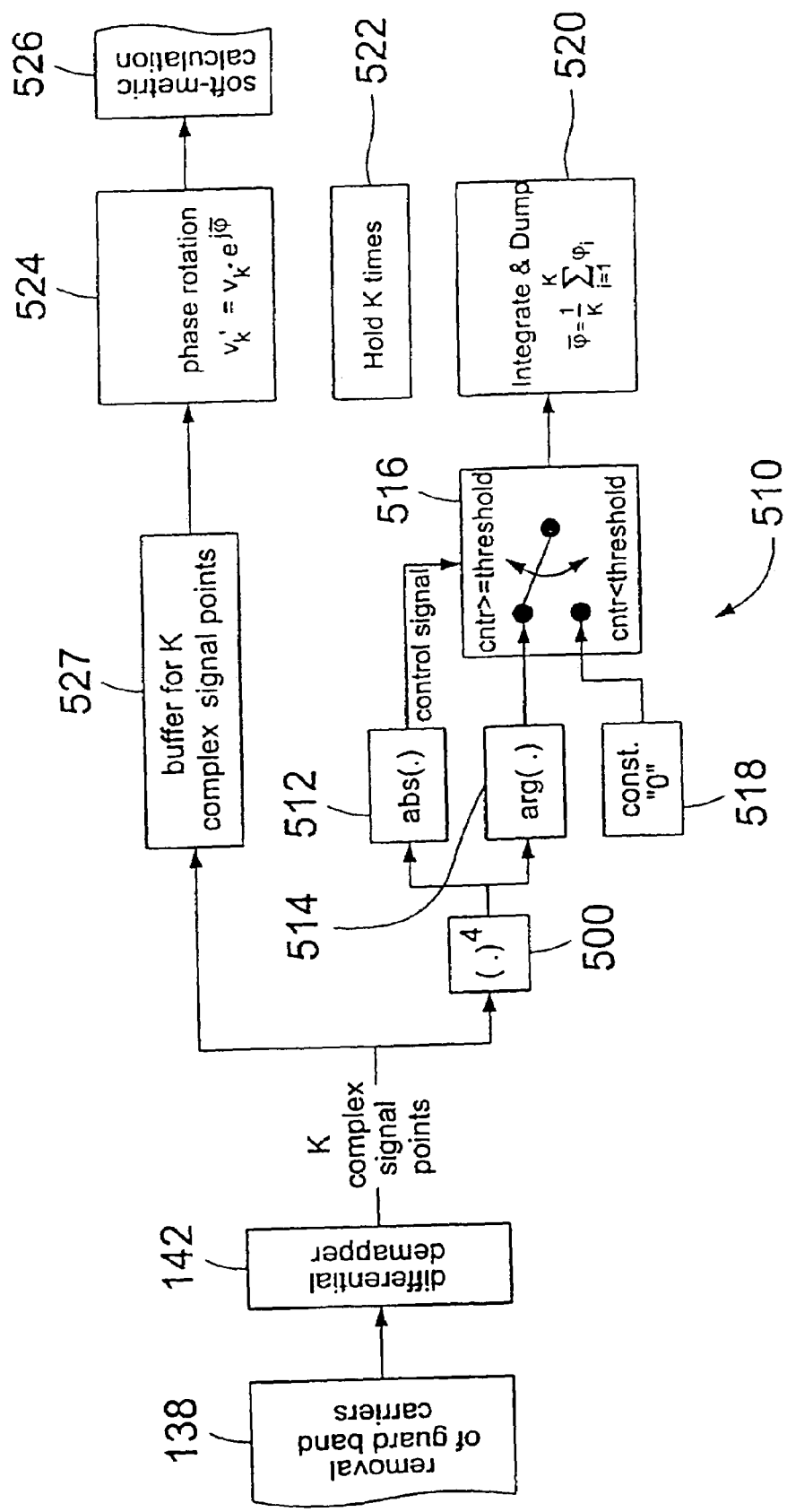
FIG. 5 shows a schematic block diagram of an embodiment of an echo phase offset correction device according to the present invention.
Figure 6:
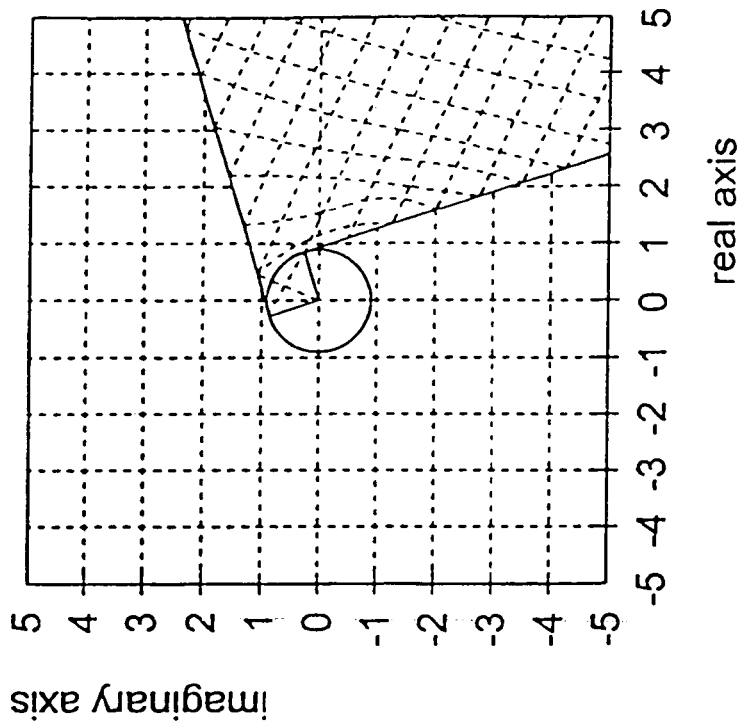
FIG. 6 shows schematic views for illustrating a projection performed by another embodiment of an echo phase offset correction device according to the present invention.
Figure 6:
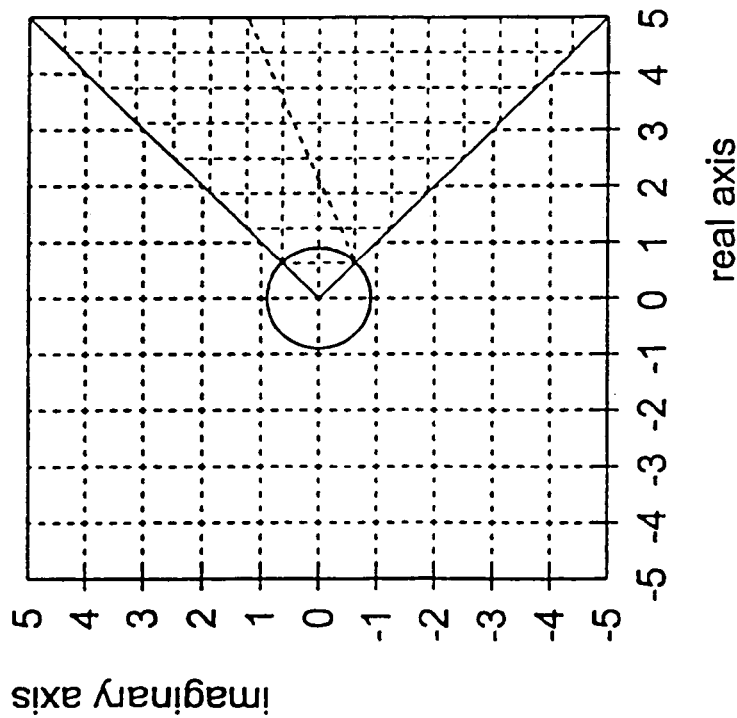

A first embodiment of an EPOC algorithm and a device for performing same is now described referring to FIG. 5.

The first embodiment of an EPOC algorithm starts from the assumption that every received differentially decoded complex symbol is rotated by an angle due to echoes in the multipath channel. For the subcarriers equal spacing in frequency is assumed since this represents a preferred embodiment of the present invention. If the subcarriers were not equally spaced in frequency, a correction factor would have to be introduced into the EPOC algorithm.

FIG. 5 shows the correction device 402 (FIG. 4) for performing the first embodiment of an EPOC algorithm.

From the output of the de-mapper 142 which contains an echo phase offset as shown for example in FIG. 3A, the phase shifts related to transmitted information must first be discarded. To this end, the output of the de-mapper 142 is applied to a discarding unit 500. In case of a DQPSK mapping, the discarding unit can perform a "$(.)^4$" operation. The unit 500 projects all received symbols into the first quadrant. Therefore, the phase shifts related to transmitted information is eliminated from the phase shifts representing the subcarrier symbols. The same effect could be reached with a modulo-4 operation.

Having eliminated the information related symbol phases in unit 500, the first approach to obtain an estimation would be to simply compute the mean value over all symbol phases of one MCM symbol. However, it is preferred to perform a threshold decision before determining the mean value over all symbol phases of one MCM symbol. Due to Rayleigh fading some of the received symbols may contribute unreliable information to the determination of the echo phase offset. Therefore, depending on the absolute value of a symbol, a threshold decision is performed in order to determine whether the symbol should contribute to the estimate of the phase offset or not.

Thus, in the embodiment shown in FIG. 5, a threshold decision unit 510 is included. Following the unit 500 the absolute value and the argument of a differentially decoded symbol is computed in respective computing units 512 and 514. Depending on the absolute value of a respective symbol, a control signal is derived. This control signal is compared with a threshold value in a decision circuit 516. If the absolute value, i.e. the control signal thereof, is smaller than a certain threshold, the decision circuit 516 replaces the angle value going into the averaging operation by a value equal to zero. To this end, a switch is provided in order to disconnect the output of the argument computing unit 514 from the input of the further processing stage and connects the input of the further processing stage with a unit 518 providing a constant output of "zero".

An averaging unit 520 is provided in order to calculate a mean value based on the phase offsets $\phi_i$ determined for the individual subcarrier symbols of a MCM symbol as follows:

$$\overline{\varphi} = \frac{1}{K} \sum_{i=1}^{K} \varphi_i \qquad \text{(Eq. 5)}$$

In the averaging unit 520, summation over K summands which have not been set to zero in the unit 516 is performed. The output of the averaging unit 520 is provided to a hold unit 522 which holds the output of the averaging unit 520 K times. The output of the hold unit 522 is connected with a phase rotation unit 524 which performs the correction of the phase offsets of the K complex signal points on the basis of the mean value $\overline{\phi}$.

The phase rotation unit 524 performs the correction of the phase offsets by making use of the following equation:

$$v'_k = v_k \cdot e^{-j\overline{\varphi}} \qquad \text{(Eq.6)}$$

In this equation, $v'_k$ designates the K phase corrected differentially decoded symbols for input into the soft-metric calculation, whereas $v_k$ designates the input symbols. As long as a channel which is quasi stationary during the duration of one MCM symbols can be assumed, using the mean value over all subcarriers of one MCM symbol will provide correct results.

A buffer unit 527 may be provided in order to buffer the complex signal points until the mean value of the phase offsets for one MCM symbol is determined. The output of the phase rotation unit 524 is applied to the further processing stage 526 for performing the soft-metric calculation.

With respect to the results of the above echo phase offset correction, reference is made again to FIGS. 3A and 3B. The two plots stem from a simulation which included the first embodiment of an echo phase offset correction algorithm described above. At the instant of the scatter diagram snapshot shown in FIG. 3A, the channel obviously distorted the constellation in a way, that a simple angle rotation is a valid assumption. As shown in FIG. 3B, the signal constellation can be rotated back to the axis by applying the determined mean value for the rotation of the differentially detected symbols.

A second embodiment of an echo phase offset correction algorithm is described hereinafter. This second embodiment can be preferably used in connection with multipath channels that have up to two strong path echoes. The algorithm of the second embodiment is more complex than the algorithm of the first embodiment.

What follows is a mathematical derivation of the second embodiment of a method for echo phase offset correction. The following assumptions can be made in order to ease the explanation of the second embodiment of an EPOC algorithm.

In this embodiment, the guard interval of the MCM signal is assumed to be at least as long as the impulse response $h[q]$, $q=0, 1, \ldots, Q_h-1$ of the multipath channel.

At the transmitter every MCM symbol is assembled using frequency axis mapping explained above. The symbol of the reference subcarrier equals 1, i.e. 0 degree phase shift. The optional phase shift PHI equals zero, i.e. the DQPSK signal constellation is not rotated.

Using an equation this can be expressed as $$a_k = a_{k-1} a_k^{inc} \tag{Eq. 7}$$

with $k$: index $k = 1, 2, \ldots, K$ of the active subcarrier;

$a_k^{inc} = e^{j\frac{\pi}{2}m}$: complex phase increment symbol;

$m = 0, 1, 2, 3$ is the QPSK symbol number which is derived from Gray encoding pairs of 2 Bits;

$a_0 = 1$: symbol of the reference subcarrier.

At the DFT output of the receiver the decision variables $$e_k = a_k H_k \tag{Eq.8}$$

are obtained with $$H_k = \sum_{i=0}^{Q_h-1} h[i] \cdot e^{-j\frac{2\pi}{K}ki} \tag{Eq. 9}$$

being the DFT of the channel impulse response $h[q]$ at position k.

With $|a_k|^2=1$ the differential demodulation yields $$v_k = e_k \cdot e_{k-1}^* = a_k^{inc} H_k H_{k-1}^* \tag{Eq.10}$$

For the receiver an additional phase term $\phi_k$ is introduced, which shall be used to correct the systematic phase offset caused by the channel. Therefore, the final decision variable at the receiver is $$v'_k = v_k \cdot e^{j\phi_k} = a_k^{inc} \cdot e^{j\phi_k} \cdot H_k \cdot H_{k-1}^* \tag{Eq.11}$$

As can be seen from the Equation 11, the useful information $a_k^{inc}$ is weighted with the product $e^{j\phi_k} \cdot H_k \cdot H_{k-1}^*$ (rotation and effective transfer function of the channel). This product must be real-valued for an error free detection. Considering this, it is best to choose the rotation angle to equal the negative argument of $H_k \cdot H_{k-1}^*$. To derive the desired algorithm for 2-path channels, the nature of $H_k \cdot H_{k-1}^*$ is investigated in the next section.

It is assumed that the 2-path channel exhibits two echoes with energy content unequal zero, i.e. at least two dominant echoes. This assumption yields the impulse response $$h[q] = c_1 \delta_0[q] + c_2 \delta_0[q-q_0] \tag{Eq.12}$$

with $c_1, c_2$: complex coefficients representing the path echoes;

$q_0$: delay of the second path echo with respect to the first path echo;

$\delta_0$: Dirac pulse; $\delta_0[k]=1$ for $k=0$
$\delta_0[k]=0$ else

The channel transfer function is obtained by applying a DFT (Eq.9) to Equation 12:

$$H_k = H\left(e^{j\frac{2\pi}{K}k}\right) = c_1 + c_2 \cdot e^{-j\frac{2\pi}{K}kq_0} \tag{Eq. 13}$$

With Equation 13 the effective transfer function for differential demodulation along the frequency axis is:

$$H_k \cdot H_{k-1}^* = \left(c_1 + c_2 e^{-j\frac{2\pi}{K}kq_0}\right) \cdot \left(c_1^* + c_2^* e^{+j\frac{2\pi}{K}(k-1)q_0}\right) \tag{Eq. 14}$$

$$= c_a + c_b \cos\left(\frac{\pi}{K}q_0(2k-1)\right)$$

Assuming a noise free 2-path channel, it can be observed from Equation 14 that the symbols on the receiver side are located on a straight line in case the symbol $1+j0$ has been send (see above assumption). This straight line can be characterized by a point $$c_a = |c_1|^2 + |c_2|^2 \cdot e^{-j\frac{2\pi}{K}q_0} \tag{Eq. 15}$$

and the vector $$c_b = 2c_1 c_2^* \cdot e^{-j\frac{\pi}{K}q_0} \tag{Eq. 16}$$

which determines its direction.

With the above assumptions, the following geometric derivation can be performed. A more suitable notation for the geometric derivation of the second embodiment of an EPOC algorithm is obtained if the real part of the complex plane is designated as x=Re{z}, the imaginary part as y=Im{z}, respectively, i.e. z=x+jy. With this new notation, the straight line, on which the received symbols will lie in case of a noise-free two-path channel, is $$f(x) = a + b \cdot x \tag{Eq. 17}$$

with $$a = \text{Im}\{c_a\} - \frac{\text{Re}\{c_a\}}{\text{Re}\{c_b\}} \cdot \text{Im}\{c_b\} \tag{Eq. 18}$$

and $$b = -\frac{\text{Im}\{c_a\} - \frac{\text{Re}\{c_a\}}{\text{Re}\{c_b\}} \cdot \text{Im}\{c_b\}}{\text{Re}\{c_a\} - \frac{\text{Im}\{c_a\}}{\text{Im}\{c_b\}} \cdot \text{Re}\{c_b\}} \tag{Eq. 19}$$

Additional noise will spread the symbols around the straight line given by Equations 17 to 19. In this case Equation 19 is the regression curve for the cluster of symbols.

For the geometric derivation of the second embodiment of an EPOC algorithm, the angle $\phi_k$ from Equation 11 is chosen to be a function of the square distance of the considered symbol from the origin:

$$\phi_k = f_K(|z|^2) \tag{Eq. 20}$$

Equation 20 shows that the complete signal space is distorted (torsion), however, with the distances from the origin being preserved.

For the derivation of the algorithm of the second embodiment, $f_K(\cdot)$ has to be determined such that all decision variables $v'_k$ (assuming no noise) will come to lie on the real axis:

$$\text{Im}\{(x + jf(x)) \cdot e^{jf_K(|z|^2)}\} = 0 \tag{Eq. 21}$$

Further transformations of Equation 21 lead to a quadratic equation which has to be solved to obtain the solution for $\phi_k$.

In case of a two-path channel, the echo phase offset correction for a given decision variable $v_k$ is $$v'_k = v_k \cdot e^{j\varphi_k} \tag{Eq. 22}$$

with $$\varphi_k = \begin{cases} -a \tan\left(\dfrac{a + b\sqrt{|v_k|^2(1+b^2) - a^2}}{-ab + \sqrt{|v_k|^2(1+b^2) - a^2}}\right) & \text{for } |v_k|^2 \geq \dfrac{a^2}{1+b^2} \\ a \tan\left(\dfrac{1}{b}\right) & \text{for } |v_k|^2 < \dfrac{a^2}{1+b^2} \end{cases} \tag{Eq. 23}$$

From the two possible solutions of the quadratic equation mentioned above, Equation 23 is the one solution that cannot cause an additional phase shift of 180 degrees.

The two plots in FIG. 15 show the projection of the EPOC algorithm of the second embodiment for one quadrant in the complex plane. Depicted here is the quadratic grid in the sector |arg(z)|≦π/4 and the straight line y=f(x)=a+b·x with a =−1.0 and b=0.5 (dotted line). In case of a noise-free channel, all received symbols will lie on this straight line if 1+j0 was send. The circle shown in the plots determines the boarder line for the two cases of Equation 23. In the left part, FIG. 15 shows the situation before the projection, in the right part, FIG. 15 shows the situation after applying the projection algorithm. By looking on the left part, one can see, that the straight line now lies on the real axis with 2+j0 being the fix point of the projection. Therefore, it can be concluded that the echo phase offset correction algorithm according to the second embodiment fulfills the design goal.

Before the second embodiment of an EPOC algorithm can be applied, the approximation line through the received symbols has to be determined, i.e. the parameters a and b must be estimated. For this purpose, it is assumed that the received symbols lie in sector |arg(z)|≦π/4, if 1+j0 was sent. If symbols other than 1+j0 have been sent, a modulo operation can be applied to project all symbols into the desired sector. Proceeding like this prevents the necessity of deciding on the symbols in an early stage and enables averaging over all signal points of one MCM symbol (instead of averaging over only ¼ of all signal points).

For the following computation rule for the EPOC algorithm of the second embodiment, $x_i$ is used to denote the real part of the i-th signal point and $y_i$ for its imaginary part, respectively (i=1, 2, . . . , K). Altogether, K values are available for the determination. By choosing the method of least squares, the straight line which has to be determined can be obtained by minimizing $$(a, b) = \arg\min_{(a,b)} \sum_{i=1}^{K} (y_i - (\tilde{a} + \tilde{b} \cdot x_i))^2 \tag{Eq. 24}$$

The solution for Equation 24 can be found in the laid open literature. It is $$b = \frac{\sum_{i=1}^{K} (x_i - \bar{x}) \cdot y_i}{\sum_{i=1}^{K} (x_i - \bar{x})^2}, \quad a = \bar{y} - \bar{x} \cdot b \tag{Eq. 25}$$

with mean values $$\bar{x} = \frac{1}{N} \sum_{i=1}^{K} x_i, \quad \bar{y} = \frac{1}{N} \sum_{i=1}^{K} y_i \tag{Eq. 26}$$

If necessary, an estimation method with higher robustness can be applied. However, the trade-off will be a much higher computational complexity.

To avoid problems with the range in which the projection is applicable, the determination of the straight line should be separated into two parts. First, the cluster's centers of gravity are moved onto the axes, following, the signal space is distorted. Assuming that a and b are the original parameters of the straight line and α is the rotation angle, $f_K(\cdot)$ has to be applied with the transformed parameters $$b' = \frac{b \cdot \cos(\alpha) - \sin(\alpha)}{\cos(\alpha) + b \cdot \sin(\alpha)}, \quad a' = a \cdot (\cos(\alpha) - b' \cdot \sin(\alpha)) \tag{Eq. 27}$$

Besides the two EPOC algorithms explained above section, different algorithms can be designed that will, however, most likely exhibit a higher degree of computational complexity.

The new mapping method for Multicarrier Modulation schemes presented herein consists in principal of two important aspects. Differential mapping within one MCM symbol along the frequency axis direction and correction of the channel echo related phase offset on the subcarriers at the receiver side. The advantage of this new mapping scheme is its robustness with regard to rapidly changing multipath channels which may occur at high frequencies and/or high speeds of mobile receivers.

What is claimed is:

1. A method of performing an echo phase offset correction in a multi-carrier demodulation system, comprising the steps of:
   differential phase decoding phase shifts based on a phase difference between simultaneous carriers having different frequencies;
   determining an echo phase offset for each decoded phase shift by eliminating phase shift uncertainties related to the transmitted information from said decoded phase shift;
   averaging said echo phase offsets in order to generate an averaged offset;
   correcting each decoded phase shift based on said averaged offset; and
   further comprising a step of comparing an absolute value of a symbol associated with a respective decoded phase shift with a threshold, wherein only phase shifts having associated therewith symbols having an absolute value exceeding said threshold are used in said step of averaging said echo phase offsets.

2. The method according to claim 1, wherein said step of differential phase decoding comprises the step of differential phase decoding phase shifts based on a phase difference between simultaneous carriers which are adjacent in the frequency axis direction.

3. The method according to claim 1, wherein said step of differential phase decoding comprises the step of differential phase decoding phase shifts based on phase differences between at least three simultaneous carriers which are equally spaced in the frequency axis direction.

4. A method of performing an echo phase offset correction in a multi-carrier demodulation system, comprising the steps of:
   differential phase decoding phase shifts based on a phase difference between simultaneous carriers having different frequencies, said phase shifts defining signal points in a complex plane;
   pre-rotating said signal points into the sector of said complex plane between $-45°$ and $+45°$;
   determining parameters a, b of a straight line approximating the location of said pre-rotated signal points in said complex plane;
   determining a phase offset based on said parameters a, b; and
   correcting each decoded phase shift based on said phase offset.

5. The method according to claim 4, wherein said simultaneous carriers are equally spaced in the frequency axis direction.

6. The method according to claim 4, wherein said step of determining said parameters a, b comprises a least squares method for selecting those parameters which minimize the deviations of said pre-rotated signal points from said straight line.

7. The method according to claim 6, wherein said parameters a, b are determined as follows:

$$b = \frac{\sum_{i=1}^{K}(x_i - \bar{x}) \cdot y_i}{\sum_{i=1}^{K}(x_i - \bar{x})^2}, \quad a = \bar{y} - \bar{x} \cdot b$$

$$\bar{x} = \frac{1}{N}\sum_{i=1}^{K} x_i, \quad \bar{y} = \frac{1}{N}\sum_{i=1}^{K} y_i$$

wherein
x and y designate the coordinates of the signal points in the complex plane,
i is an index from 1 to N, and
K is the numer of signal points.

8. The method according to claim 7, wherein said phase offset $\phi_k$ is determined as follows:

$$\varphi_k = \begin{cases} -a \tan\left(\dfrac{a + b\sqrt{|v_k|^2(1+b^2) - a^2}}{-ab + \sqrt{|v_k|^2(1+b^2) - a^2}}\right) & \text{for } |v_k|^2 \geq \dfrac{a^2}{1+b^2} \\ a \tan\left(\dfrac{1}{b}\right) & \text{for } |v_k|^2 < \dfrac{a^2}{1+b^2} \end{cases}$$

wherein $v_k$ is a given decision variable.

9. An echo phase offset correction device for a multi-cattier demodulation system, comprising:
   a differential phase decoder for decoding phase shifts based on a phase difference between simultaneous carriers having different frequencies;
   means for determining an echo phase offset for each decoded phase shift comprising means for eliminating phase shift uncertainties related to the transmitted information from said decoded phase shift;
   means for averaging said echo phase offsets in order to generate an averaged offset;
   means for correcting each decoded phase shift based on said averaged offset; and
   means for comparing an absolute value of a symbol associated with a respective decoded phase shift with a threshold, wherein said means for averaging said phase offsets only uses phase shifts having associated therewith symbols having an absolute value exceeding said threshold.

10. The device according to claim 9, wherein said differential phase decoder is adapted for decoding said phase shifts based on a phase difference between simultaneous carriers which are adjacent in the frequency axis direction.

11. The device according to claim 9, wherein said differential phase decoder is adapted for decoding said phase shifts based on phase differences between at least three simultaneous carriers which are equally spaced in the frequency axis direction.

12. An echo phase offset correction device for a multi-carrier demodulation system, comprising:
   a differential phase decoder for decoding phase shifts based on a phase difference between simultaneous carriers having different frequencies, said phase shifts defining signal points in a complex plane;

means for pre-rotating said signal points into the sector of said complex plane between −45° and +45°;

means for determining parameters a, b of a straight line approximating the location of said pre-rotated signal points in said complex plane;

means for determining a phase offset based on said parameters a, b; and means for correcting each decoded phase shift based on said phase offset.

13. The device according to claim 12, wherein said differential phase decoder comprises means for decoding phase shifts of at least three simultaneous carriers which are equally spaced in the frequency axis direction.

14. The device according to claim 12, wherein said means for determining said parameters a, b comprises means for performing a least squares method for selecting those parameters which minimize the deviations of said pre-rotated signal points from said straight line.

15. The device according to claim 14, wherein said means for determining said parameters a, b calculates said parameters a, b as follows:

$$b = \frac{\sum_{i=1}^{K}(x_i - \bar{x}) \cdot y_i}{\sum_{i=1}^{K}(x_i - \bar{x})^2}, \quad a = \bar{y} - \bar{x} \cdot b$$

-continued $$\bar{x} = \frac{1}{N}\sum_{i=1}^{K} x_i, \quad \bar{y} = \frac{1}{N}\sum_{i=1}^{K} y_i$$

wherein x and y designate the coordinates of the signal points in the complex plane, i is an index from 1 to N, and K is the number of signal points.

16. The device according to claim 15, wherein said means for determining said phase offset $\phi_k$ calculates said phase offset $\phi_k$ as follows:

$$\varphi_k = \begin{cases} -a\tan\left(\dfrac{a + b\sqrt{|v_k|^2(1+b^2) - a^2}}{-ab + \sqrt{|v_k|^2(1+b^2) - a^2}}\right) & \text{for } |v_k|^2 \geq \dfrac{a^2}{1+b^2} \\ a\tan\left(\dfrac{1}{b}\right) & \text{for } |v_k|^2 < \dfrac{a^2}{1+b^2} \end{cases}$$

wherein $v_k$ is a given decision variable.

* * * * *